Aug. 9, 1955 E. F. EIMER 2,714,869
BULK TANK GAUGE
Filed June 18, 1954
FIG. 1
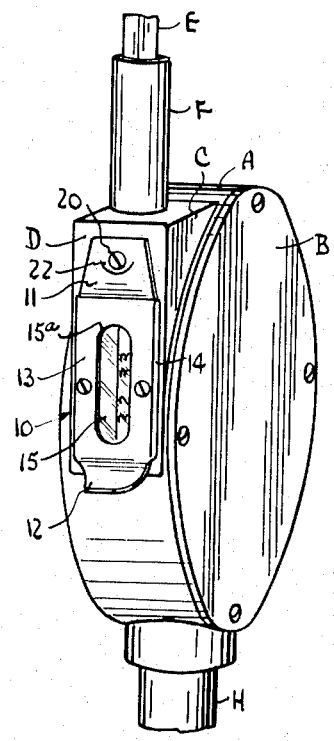
FIG. 2
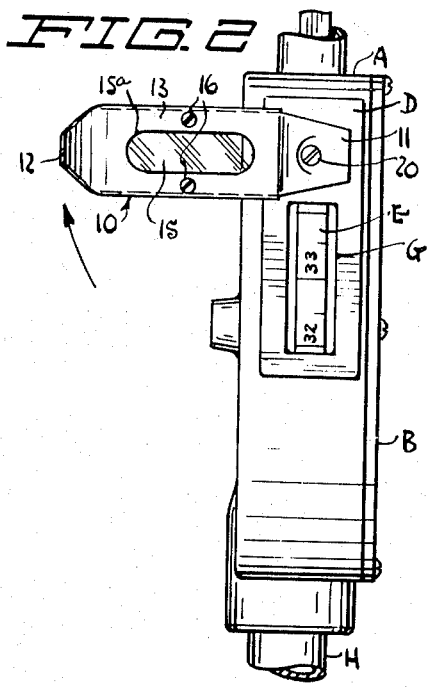
FIG. 5
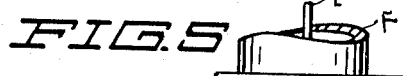
FIG. 3  FIG. 4
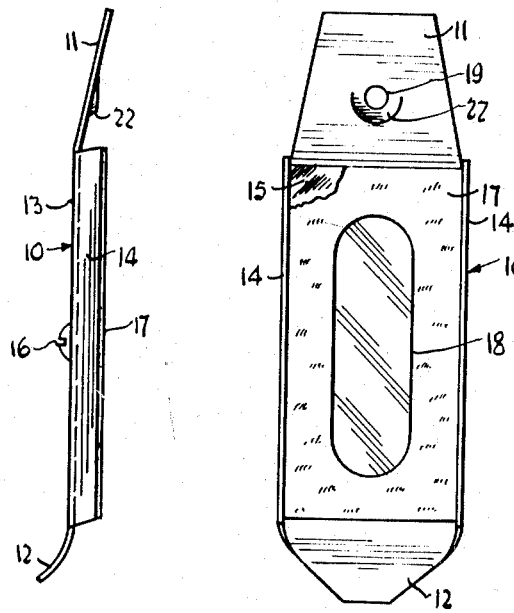
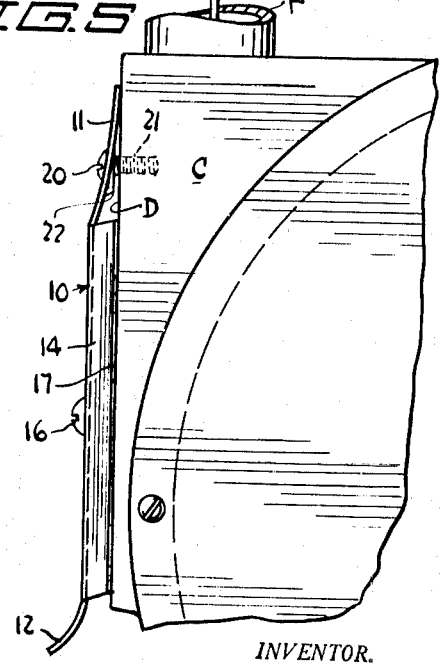
INVENTOR.
ERWIN F. EIMER
BY
Carlsen & Hagle
ATTORNEYS

United States Patent Office 2,714,869
Patented Aug. 9, 1955

2,714,869

BULK TANK GAUGE

Erwin F. Eimer, Minneapolis, Minn.

Application June 18, 1954, Serial No. 437,800

3 Claims. (Cl. 116—118)

This invention relates generally to improvements in gauges for indicating the level of fluids which are commonly stored in horizontal and vertical tanks, such as oil, gasoline, and all of the other various materials so stored.

In many instances it has been necessary to climb these tanks and open them in order to determine the level of their contents and this is not only a time consuming and often dangerous task, but the opening of the tanks causes losses of valuable vapors where the material stored is of a readily vaporable nature. Accordingly, I have provided a completely enclosed, weatherproof and vaportight gauge arrangement by which the level of the material in the tank may be read from ground level, and in general this gauge arrangement comprises a spring-biased reel assembly located in a housing, about which reel there is coiled a graduated tape connected through suitable means to a float within a tank so that as the level of the material in the tank varies the gauge will be pulled off the reel or, alternatively, rerolled by the spring bias on the reel. It will be readily appreciated that this type of gauge lends itself to application to all commonly used types of storage tanks and also that the connections between the tape and the float may be made through suitable pipes and elbows so that the entire assembly is vaportight and weatherproof. It is, of course, necessary that the housing containing the reel have an observation opening through which the tape may be observed or serviced if necessary, and customarily this opening would be closed by a vaportight, transparent window. This arrangement is satisfactory except where conditions are such that the window becomes clouded, due to frost or the like, in which case reading of the tape becomes difficult or impossible.

It is therefore the primary object of my present invention to provide a movable closure for the observation opening in the reel housing so that such closure may be moved aside clear of the opening, in order to view or service the tape, and to provide such closure with a suitable gasket in order to provide a vaportight seal about the margins of the observation opening along with a spring bias upon the closure to hold such gasket in tight sealing relation when the closure is in place over the opening. It is another object of my invention to provide a closure of this type which itself carries the observation window of transparent material through which the tape may be observed under normal conditions, so that the closure need not be moved except when this window becomes clouded by the accumulation of moisture or frost and except, of course, when it is necessary to service the tape through the opening. Still a further object of my invention is to provide what may be termed a swing-aside closure for this purpose, in conjunction with a flat surface formed upon the reel housing and with the closure mounted by a single screw so that the structure is simple and inexpensive in nature. In order, then, to provide the necessary spring tension for holding the gasket tightly about the edges of the observation opening in the housing, the closure is provided with a tempered tang end extended at an angle to the flat surface on the housing and put under tension by drawing up the screw so that the gasket is forced tightly about the edges of the opening and then the opposite end of the closure is provided with a finger piece so that the closure may be pulled outward far enough to permit it to be swung aside to clear the observation opening.

These and other more detailed and specific objects will be disclosed in the course of the following specification, reference being had to the accompanying drawings, in which—

Fig. 1 is a perspective view of the reel housing with the closure of my invention in its normal position and showing adjacent portions of the pipes by which the housing is supported at ground level and through which the tape is connected to the float within the tank.

Fig. 2 is an edge view of the reel housing but showing the closure of my invention swung aside to completely clear the observation opening through which the tape is visible.

Figs. 3 and 4 are respectively edge and inside elevational views on an enlarged scale of the closure element alone.

Fig. 5 is a side elevation of a portion of the reel housing showing the flat surface upon which the closure is seen mounted.

Referring now more particularly and by reference characters to the drawing, the pertinent portions of the gauge as a whole comprise a generally circular reel housing A, having a removable vaportight cover B and formed with a shoulder C having a flat surface D. Housed within the said housing A is a spring-biased reel upon which is coiled a graduated tape E which emerges from the housing through a pipe F and through which the tape is suitably connected to a float within the tank (both not shown) containing the material to be measured, it being readily understood that as the float descends, due to the level of the material dropping, the tape will be pulled from the reel, and vice-versa. An observation opening G, rectangular in shape, is formed through said flat surface D and the tape E may be viewed through this opening in order to thus determine the level of the material in the tank. Such opening also permits minor servicing of the tape if required. There is also a pipe H extending downwardly from the housing A for supporting the same, but this arrangement is immaterial to an understanding of my present invention.

In the ordinary instance the opening G would be tightly closed by a transparent window (not shown) and the housing A along with the pipes F and H, and all related piping, form a vaportight connection with the interior of the tank so that valuable vapors will not escape through the pipes of the gauge system. As a result, however, there may be a considerable difference between the temperature inside of the gauge and the surrounding air causing clouding of the window or frosting thereof, making it difficult, if not impossible, to read the tape.

According to my invention I provide a movable and what may well be referred to as a swing-aside closure, designated generally at 10, for the observation opening G made up of sheet material of generally rectangular shape having a tapered tang end 11 and a more sharply tapered, outwardly curved finger piece 12 at its opposite end. The intervening rectangular central portion 13 of the closure is flat but has its lateral margins 14 turned inwardly in the form of flanges to partially enclose and protect a transparent window of rectangular shape, which is designated at 15 and which is held in place by screws 16. The portion 13 of the closure also has a window opening 15a corresponding approximately with the area of the observation opening G in the reel housing and thus with the closure in place the reel may be read through the window 15. I prefer to make the window 15 of some transparent plastic so that the screws 16 may be readily tapped thereinto. Cemented then or otherwise secured upon the inner surface of the window 15 is a gasket 17 of cork or other suitable material which has an opening 18 approximating the shape and area of the opening 17 in the metallic portion of the closure in order to not obstruct the view of the tape.

The tang end 11 of the closure, or in fact the entire metallic portion thereof after it has been formed to shape, is spring tempered and it will also be noted that this end angles slightly from the plane of the central portion 13 of the closure, toward the surface D of the housing, when the closure is placed with the gasket 17 in contact with that surface about the edges of the opening G. The tang end 11 is also provided with an opening 19 and an ordinary screw 20 is passed through this opening and screwed into a suitably located tapped opening 21 in the housing so that when this screw is pulled fairly tight it will spring the end 11 into the bowed shape shown best in Fig. 5, as a result of which the gasket 17 will be caused to bear firmly about the edges of the opening G and effect a vaportight seal. However, if and when the window 15 becomes clouded or frosted, or whenever it is otherwise necessary to obtain access through the opening G to the tape E, it will be readily possible for the operator to pull outward upon the finger piece end 12 sufficiently to permit the closure to be swung aside, as seen in Fig. 2, completely clear of the opening. Of course, the width of the flange sides 14 of the closure is such that they permit the gasket 17 alone to project into contact with the surface D, in order not to scratch or otherwise mar that surface as the closure is operated from opening to closed positions.

Thus it will be seen that I have provided an extremely simple, swing-aside closure which will maintain a vaportight seal over the observation opening of the gauge and which may be readily moved aside when it is necessary to read the tape or to service the same. In order that the head of the screw 20 may meet a flat bearing surface upon the bowed tang end 11 of the closure and thus not wear the same unevenly, a semi-circular depression or inset 22 is formed about the opening 19 and thus, with the closure properly held in tension by the screw, this inset 22 will form an area about the opening 19 which is parallel with the surface D and therefore with the bearing surface of the screw head, as will be readily appreciated.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. The combination in a measuring device for indicating the level of material stored in a bulk tank and which device includes a housing wherein is a graduated tape moved in response to variations in said level and which housing has an observation opening for viewing the tape and the housing having a flat surface about the said opening; of a closure swingably mounted on the housing to normally close said opening and having a gasket fitting said flat surface and a window through which the tape may be viewed, the said closure having a tang end tempered and pivoted to said housing causing the gasket to fit the housing tightly.

2. The combination in a measuring device for indicating the level of material stored in a bulk tank and which device includes a housing wherein is a graduated tape moved in response to variations in said level and which housing has an observation opening for viewing the tape and the housing having a flat surface about the said opening; of a closure swingably mounted on the housing to normally close said opening and having a gasket fitting said flat surface and a window through which the tape may be viewed, the said closure including an angularly extending spring tempered tang end having a screw opening, a screw extending through said opening into the housing to pivotally mount the closure and by bowing the tang end to thereby press the gasket tightly to the housing, and a depression formed in said tang end about the opening to form a flat bearing surface for the screw head.

3. For a measuring device for measuring material stored in a tank and which device includes a float actuated tape enclosed in a housing having an observation opening for viewing the tape; the improvement which comprises a closure for said opening made from sheet material and having a window opening normally registering with said observation opening, a transparent window secured over said window opening, a gasket secured to the closure to seal around the edge of said observation opening, one end of the closure being angularly extended and spring tempered and having a screw opening, a screw extending through the latter opening into the housing to pivotally mount the closure and the screw bowing the tempered end of the closure to cause the gasket to bear firmly against the housing, and the opposite end of the closure having an outwardly curved finger piece by which the closure may be pulled away from the housing and the closure swung aside clear of the observation opening in the housing.

References Cited in the file of this patent

UNITED STATES PATENTS

| | | |
|---|---|---|
| 1,759,572 | Hall | May 20, 1930 |
| 2,637,111 | McDuff | May 5, 1953 |